United States Patent
Millington et al.

(10) Patent No.: US 7,170,518 B1
(45) Date of Patent: Jan. 30, 2007

(54) SELECTIVE RENDERING OF CARTOGRAPHIC ENTITIES FOR A NAVIGATION SYSTEM

(75) Inventors: Jeffrey Alan Millington, Rochester Hills, MI (US); Chandiran Palanisamy, Rochester Hills, MI (US)

(73) Assignee: Magellan Dis, Inc., Rochester Hills, MI (US)

( * ) Notice: Subject to any disclaimer, the term of this patent is extended or adjusted under 35 U.S.C. 154(b) by 0 days.

(21) Appl. No.: 09/535,733

(22) Filed: Mar. 27, 2000

(51) Int. Cl.
*G09T 15/10* (2006.01)

(52) U.S. Cl. .................. 345/428; 701/65; 701/201

(58) Field of Classification Search .............. 701/202, 701/211, 200, 201, 65; 345/427, 418, 428
See application file for complete search history.

(56) References Cited

U.S. PATENT DOCUMENTS

| | | | | |
|---|---|---|---|---|
| 4,737,916 A | * | 4/1988 | Ogawa et al. | 701/200 |
| 4,827,419 A | * | 5/1989 | Selby, III | 701/200 |
| 5,067,081 A | * | 11/1991 | Person | 701/202 |
| 5,075,693 A | | 12/1991 | McMillan et al. | |
| 5,247,356 A | * | 9/1993 | Ciampa | 348/144 |
| 5,311,173 A | * | 5/1994 | Komura et al. | 340/995.22 |
| 5,381,338 A | * | 1/1995 | Wysocki et al. | 701/207 |
| 5,418,537 A | * | 5/1995 | Bird | 342/357.09 |
| 5,559,707 A | | 9/1996 | DeLorme et al. | |
| 5,631,970 A | * | 5/1997 | Hsu | 382/113 |
| 5,684,476 A | | 11/1997 | Anderson | |
| 5,699,244 A | * | 12/1997 | Clark et al. | 702/2 |
| 5,764,014 A | | 6/1998 | Jakeway et al. | |
| 5,777,580 A | * | 7/1998 | Janky et al. | 342/457 |
| 5,884,216 A | * | 3/1999 | Shah et al. | 701/207 |
| 5,902,347 A | * | 5/1999 | Backman et al. | 701/200 |
| 5,948,040 A | * | 9/1999 | DeLorme et al. | 701/201 |
| 5,961,571 A | * | 10/1999 | Gorr et al. | 701/207 |

(Continued)

FOREIGN PATENT DOCUMENTS

EP 0860688 A2 8/1998

OTHER PUBLICATIONS

Crisman Jill D.; Thorpe, Charles E., A color vision system that tracks roads and intersections.IEEE,v9,n1,p. 49(10) Feb. 1993.*
Auto Nav 2000 Plus, Inc. 750M , Features and benefits.*

*Primary Examiner*—Kee M. Tung
*Assistant Examiner*—J. Amini
(74) *Attorney, Agent, or Firm*—Lowe Hauptman & Berner, LLP

(57) ABSTRACT

A method of selectively providing cartographic features on a video display of a navigation system for improved rendering is provided. The method includes the steps of determining an operational mode of the navigation system, selecting a desired cartographic entity for a cartographic feature based upon the operational mode, and displaying the desired cartographic entity on the video display. For example, less detailed cartographic entities are selected for display when the navigation system is in an operational mode that requires the video display to be updated frequently ore a mode in which it is desirable to focus the user's attention on a different cartographic entity. The less detailed cartographic entity may have a lower intensity than or contrast less with surrounding cartographic entities. In this manner, the user may be provided the desired level of map details with the video display regenerated rapidly.

23 Claims, 4 Drawing Sheets

U.S. PATENT DOCUMENTS

| | | | |
|---|---|---|---|
| 6,005,578 A * | 12/1999 | Cole | 345/854 |
| 6,028,537 A * | 2/2000 | Suman et al. | 340/988 |
| 6,084,989 A * | 7/2000 | Eppler | 382/293 |
| 6,204,778 B1 * | 3/2001 | Bergan et al. | 340/905 |
| 6,249,740 B1 * | 6/2001 | Ito et al. | 340/910 |
| 6,356,210 B1 * | 3/2002 | Ellis | 340/990 |
| 6,370,475 B1 * | 4/2002 | Breed et al. | 701/301 |
| 6,377,278 B1 * | 4/2002 | Curtright et al. | 345/634 |
| 6,397,145 B1 * | 5/2002 | Millington | 701/208 |

* cited by examiner

SELECTIVE RENDERING OF CARTOGRAPHIC ENTITIES FOR A NAVIGATION SYSTEM

BACKGROUND OF THE INVENTION

This invention relates to vehicle navigation systems and, more specifically, to map images appearing on a navigation system video screen of a display device.

Vehicle navigation systems typically include a display device with a video display that provides a graphical interface for the user. A main function of the video display is to depict the desired map area and route on which the user's vehicle is travelling. The map area shows various cartographic features, such as lakes and golf courses, to increase the utility to the user. These cartographic features are represented by cartographic entities that convey the nature of the cartographic feature so that the user may easily interpret it. For example, a solid green body may be used to represent a golf course and a solid blue body may be used to represent a lake. The map area shown on the video display may have numerous cartographic entities displayed making the vehicle route, which is typically the user's primary interest, more difficult to identify. That is, the shear number of cartographic entities displayed on the video display distracts the user and increases the amount of time it takes the user to locate the vehicle route on the video display. Additionally, displaying numerous cartographic entities increases the time it takes to regenerate or update the video display, which may cause an undesirable delay in displaying the updated information to the user as the vehicle moves across the map area. Furthermore, the intensity of the vehicle route and other roads in the map area are the same, making it difficult to quickly identify the vehicle route.

Depending upon the operational mode of the navigation system, it may be desirable to vary the intensity of certain roads and/or have fewer or less detailed cartographic entities displayed such as described above. However, in some operational modes it may desirable to display cartographic entities for all the cartographic features. Therefore, it is desirable to selectively display cartographic entities based upon the operational mode of the vehicle navigation system. In this manner, the user may be provided the desired level of map details and have the video display regenerated rapidly.

SUMMARY OF THE INVENTION AND ADVANTAGES

The present invention provides a method of selectively displaying cartographic features on a video display of a navigation system for improved rendering. The method includes the steps of determining an operational mode of the navigation system, selecting a desired cartographic entity for a cartographic feature based upon the operational mode, and displaying the desired cartographic entity on the video display. For example, less detailed cartographic entities are selected for display when the navigation system is in an operational mode that requires the video display to be updated frequently.

Accordingly, the above invention provides the desired level of map details and have the video display regenerated rapidly.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
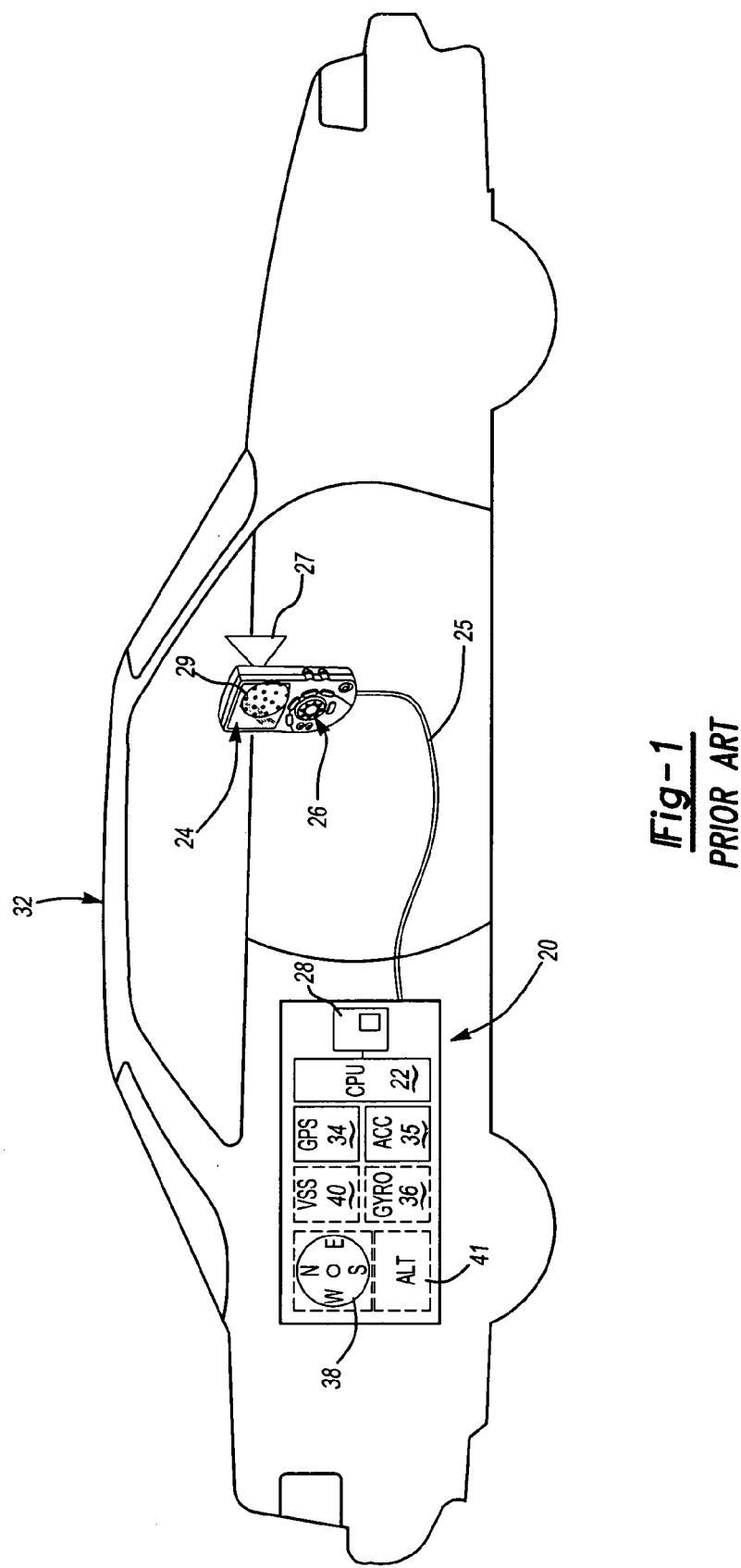
FIG. 1 is a schematic view of the vehicle navigation system of the present invention.

The navigation system 20 of the present invention is shown schematically in FIG. 1. The navigation system 20 includes a CPU 22 (Central Processing Unit) connected to a display device 24 and a directional input device 26 attached to the vehicle interior by a bracket 27, or the like. The navigation system 20 further includes a database 28 connected to the CPU 22. The database 28 is a mass media storage device, such as a CD-ROM, hard drive, DVD, RAM, ROM or the like which includes a map of the road system in the area to be traveled by the user. Each road in the database is divided into road segments, each having an associated set of cost values, which indicate the "cost" of traveling that road segment. For example, the cost values may include the length of the road segment, the estimated time to travel the road segment, and the type of road (i.e., highway, secondary road, toll road, one way, etc.). The road segment may be part of the vehicle route or may be a road segment outside the vehicle route.

The database 28 also stores the type location and shape of the cartographic features and entities like: ocean or coastline, river, canal, water channel, lake, bay or harbor, golf course, railroad, island, city, Native American reservation, built up area, county, country, state, national park or monument, state park, city or county park, woodland, shopping center, university or college, cemetery, sports complex, hospital, airport, military base, pedestrian zone, aircraft road, industrial complex, or junction. Of course, the above list of cartographic features is only illustrative of the cartographic features that may be included on a map.

The navigation system 20 can, but need not, be installed in a vehicle 32. The navigation system can be used in conjunction with position determining devices, such as a GPS receiver 34 and a multi-axis accelerometer 35. Navigation system 20 could alternatively or additionally include a gyroscope 36, a compass 38, and a wheel speed sensor 40, all connected to the CPU 22 (connections not shown for simplicity). Preferably, a combination of these position determining devices is utilized to assure accurate location.

Figure 2:
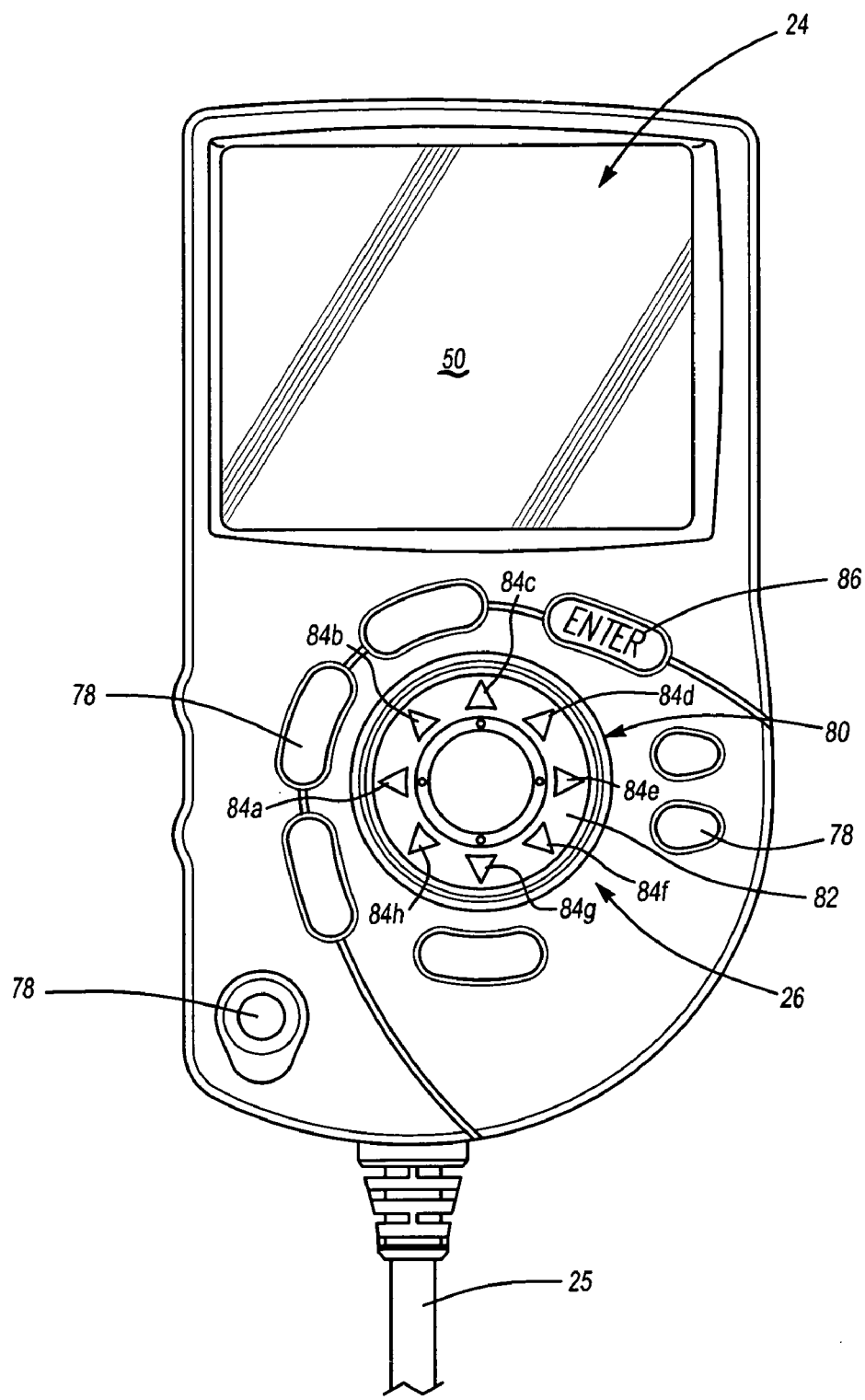
FIG. 2 is a front elevational view of the vehicle navigation system display unit having a video display.

FIG. 2 is a perspective view of one disclosed embodiment of the display device 24 and directional input device 26, preferably designed as an integral unit attached to the CPU by connection 25. The display device 24 includes a video display 50, or screen, such as a high resolution LCD or flat panel display. The directional input device 26 includes a multiple of input buttons 78 including, preferably, an eight-way button shown generally at 80 and a selection key 86 such as an "Enter" key. Although an eight-way button is shown, it will be realized that other input devices, such as a joystick, mouse or roller ball can be employed.

The internal disk 82 is pivotally mounted in the eight-way button 80 and is capable of moving in the direction of any one of the directional arrows 84. Movement of the internal disk 82 in the direction of one of the directional arrows 84 transmits a directional signal.

Figure 3:
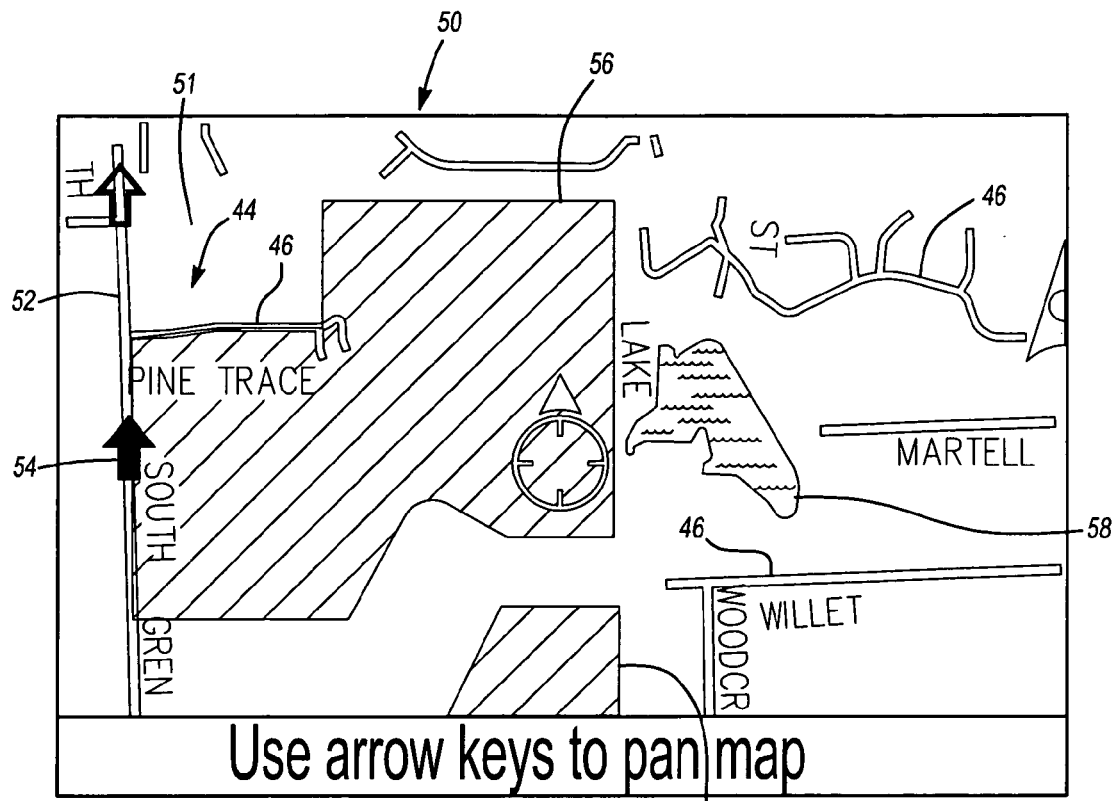
FIG. 3 is the video display of the display unit in a first operational mode.
Figure 4:
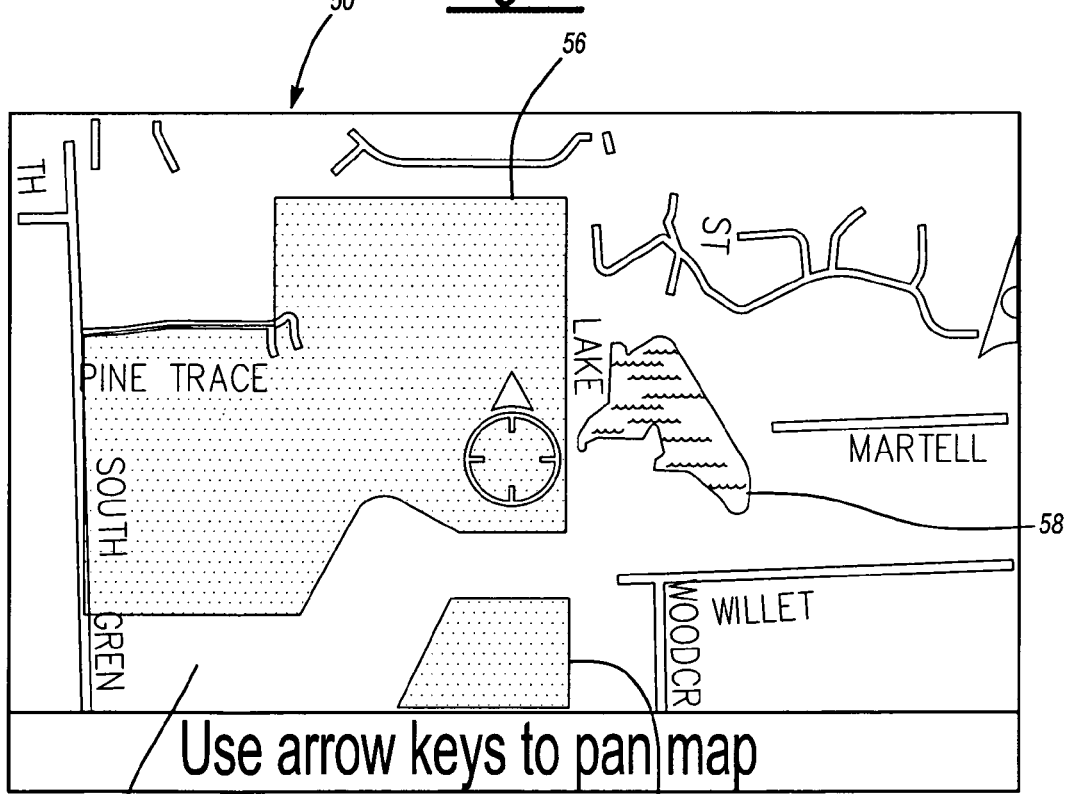
FIG. 4 is the video display of the display unit in a second operational mode.
Figure 5:
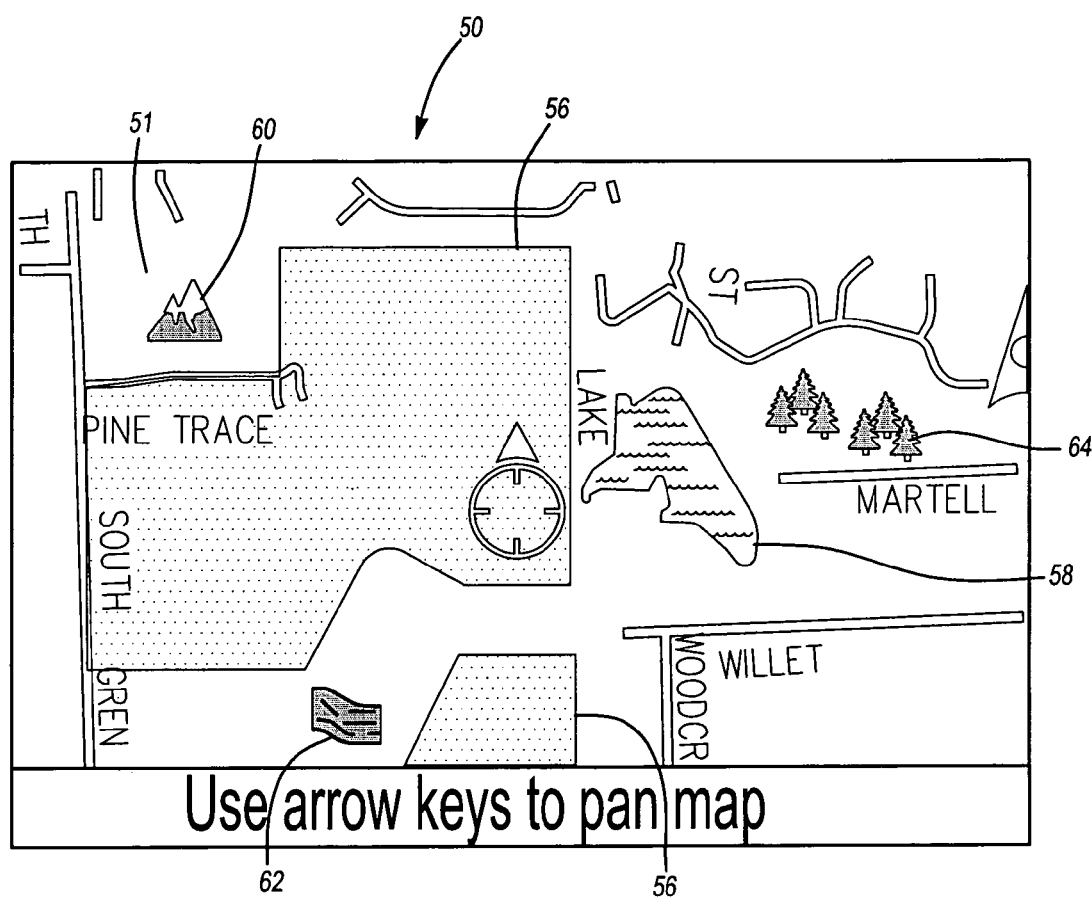
FIG. 5 is the video display of the display unit in a third operational mode.

FIGS. 3–5 are video displays of the same map area in different operational modes using the present invention. FIG. 3 depicts the video display 50 for a particular map area 51 when the navigation system is in an on-road guidance mode. In on-road guidance mode, the vehicle route 52 is highlighted in a bright color, such as magenta, and arrows 54 overlay the route for easy identification by the user. On-road guidance mode is typically used when the user selects a particular destination. The navigation system then selects and highlights the route 52 based upon certain user selected parameters, such as shortest distance or shortest time. Since the intended focal point of the map area is the vehicle route 50, it is desirable that there be fewer and less detailed cartographic entities for the cartographic features in the map area. In this patent application cartographic feature means an aspect of the map area, such as a lake, golf course, forest, mountain, or sports arena. Cartographic entity means the icon used to represent the particular cartographic feature, such as a tree used to represent the location of a woodland in the map area. Road segments are the cartographic entities used to represent the cartographic feature of a road system.

In the on-road guidance mode shown in FIG. 3, a golf course 56 is represented by a cartographic entity defined by a perimeter having cross-hatching within the perimeter. The lines of the cartographic entity are green and are easily regenerated compared to a similarly shaped cartographic entity that is solid. A similar cartographic entity with blue lines is used to represent a lake 58, with the cross-hatching oriented in a different direction so that a user may more easily distinguish the lake from the golf course. Not all the cartographic features may be displayed in on-road guidance mode. In the preferred embodiment, cartographic entities for the following cartographic features would be displayed: ocean or coastline, river, canal or water channel, lake, bay or harbor, golf course and railroad.

As mentioned above, the road system 44 includes road segments 46. In on-road guidance mode, one of the road segments 46 is the vehicle route 52. Although the vehicle route 52 may be a different color than the other road segments 46, the vehicle route 52 may not stand out due to the number of cartographic entities being displayed or because of their similar entities. With the present invention, during on-road guidance mode the vehicle route 52 is displayed at full intensity while the other cartographic entities, including road segments, rivers, lakes, etc., are displayed at a lower intensity. Typically, the cartographic entities are displayed using a color palette having blue, green and red values. For cartographic entities displayed at a lower intensity, the blue, green, and red values may be decreased by an equal percentage, preferably, approximately twenty-five percent. The desired intensity is approximately twenty-five percent less than the vehicle route intensity wherein the first blue, green, and red values are approximately twenty-five percent less than the second blue, green, and red values, respectively.

FIG. 4 depicts the video display 50 for a particular map area 51 when the navigation system is in on-road mode. In on-road mode, no particular destination has been selected by the user. In this mode more detail may be desired than in on-road guidance mode because the user has not necessarily decided upon a particular route and knowledge of cartographic features may be more important to the user. Accordingly, it may be desirable to have the cartographic entities displayed more prominently so that they may be more quickly focused upon by the user. The golf course 56 and lake 58 are defined by the perimeter with solid shading so that the cartographic entity stands out. Not all the cartographic features may be displayed in on-road mode. In the preferred embodiment, cartographic entities for the following cartographic features would be displayed: ocean or coastline, river, canal or water channel, lake, bay or harbor, golf course and railroad.

FIG. 5 depicts the video display for a particular map area when the navigation system is in off-road mode. In off-road mode, the navigation system has determined that the vehicle is no longer on any known road and that the vehicle is travelling off the road. It is important that the user be aware of the surrounding cartographic features since the user is no longer utilizing known roads. To this end, preferably cartographic entities for all the cartographic features are displayed using the most detail. Cartographic features may now be seen by the user that could not be seen in on-road guidance and on-road modes. For example, mountain 60, river 62, and tree 64 cartographic entities are displayed representing the mountain, river, and woodland cartographic features. Other cartographic features for which cartographic entities are now displayed are: island, city, Native American reservation, built up area, county, country, state, national park or monument, state park, city or county park, woodland, shopping center, university or college, cemetery, sports complex, hospital, airport, military base, pedestrian zone, aircraft road, industrial complex, and junction.

Particular cartographic entities may be displayed to customers having specific interests. For example, a utility company may be interested in utility poles or easement being displayed in a particular mode.

The navigation system may include other operational modes in addition to the modes described above. One such operational mode may involve vehicle speed. If the vehicle is travelling rapidly compared to the map area displayed on the video screen, the map area may have to be regenerated frequently. As a result, it may be desirable to provide fewer and less detailed cartographic entities to minimize delay in displaying the updated information to the user. Therefore, the navigation system may enter into an operational mode when a predetermined vehicle speed is reached. Such an operational mode is relative to the operational mode from which the navigation system is changing. For example, if the navigation system is currently on-road guidance mode, which has few and less detailed cartographic entities, there may be no visible change in the display 50 when the predetermined speed is reached. However, if the current mode is off-road, then when the predetermined speed is reached fewer and less detailed cartographic entities will be displayed.

The navigation system may enter another operational mode displaying fewer and less detailed cartographic entities when the user pans the displayed map area using the arrow button 80. Similar to the vehicle speed operational mode discussed above, the panning operational mode is relative to the operational mode from which the navigation system is changing.

The present invention provides a method of selectively displaying cartographic features on a video display of a navigation system. It is to be understood that any type of cartographic entity may be used for a cartographic feature in a particular operational mode. That is, the present invention may be accomplished by displaying different cartographic entities than described above. In operation, the navigation system determines an operational mode of the navigation system. The operational mode may be manually selected by the user or automatically determined by the navigation system, such as when entering off-road mode. The navigation system then selects a desired cartographic entity for a cartographic feature based upon the operational mode. If the navigation system is in a mode where fewer cartographic entities are desired, the navigation system may select no cartographic entity for a particular cartographic feature. An example of this is shown in FIGS. 3 and 4 where no cartographic entity is selected for the river, woodland, and mountains. Finally, the navigation system displays the desired cartographic entity on the video display. Again, no cartographic entity may be selected for display.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of selectively displaying cartographic features on a video display of a navigation system, the method comprising the steps of:
   a) determining an operational mode of the navigation system, wherein the navigation system includes first and second operational modes with the first operational mode comprising an on-road mode in which a vehicle position is displayed relative to a road system and with the second operational mode comprising an off-road mode in which the vehicle position is displayed irrelative to a road system;
   b) selecting a desired cartographic entity for a cartographic feature based upon the operational mode including selecting a less detailed desired cartographic entity for the cartographic feature in the first operational mode and selecting a more detailed desired cartographic entity than the less detailed desired cartographic entity for the same cartographic feature in the second operational mode; and
   c) displaying the selected desired cartographic entity on the video display.

2. The method of claim 1, wherein the less detailed desired cartographic entity is no cartographic entity.

3. The method of claim 1, wherein a first cartographic entity is displayed when the navigation system is in off-road mode and said first cartographic entity is not displayed when the navigation system is in on-road mode.

4. The method of claim 1, wherein the navigation system includes a third operational mode comprising on-road guidance mode, and step b) includes selecting a least detailed desired cartographic entity that is one of the same as the less detailed desired cartographic entity and a less detailed version of the less detailed desired cartographic entity than the less detailed desired cartographic entity for the on-road mode.

5. A method of selectively displaying cartographic features on a video display of a navigation system, the method comprising the steps of:
   a) determining an operational mode of the navigation system, wherein the navigation system includes first and second operational modes and the first operational mode is defined by a predetermined vehicle speed;
   b) selecting a desired cartographic entity for a cartographic feature based upon reaching the predetermined vehicle speed in the first operational mode including selecting a less detailed desired cartographic entity for the cartographic feature at the predetermined vehicle speed in the first operational mode and selecting a more detailed desired cartographic entity than the less detailed desired cartographic entity for the same cartographic feature in the second operational mode; and
   c) displaying the select desired cartographic entity on the video display.

6. A method of selectively displaying cartographic features on a video display of a navigation system, the method comprising the steps of:
   a) determining an operational mode of the navigation system, wherein the navigation system includes first and second operational modes and the first operational mode comprises a panning mode in which a displayed area on the video display is shifted relative to a displayed vehicle location independent of a change in vehicle location;
   b) selecting a desired cartographic entity for a cartographic feature based upon the operational mode including selecting a less detailed desired cartographic entity for the cartographic feature in the first operational mode and selecting a more detailed desired cartographic entity than the less detailed desired cartographic entity for the same cartographic feature in the second operational mode; and
   c) displaying the selected desired cartographic entity on the video display.

7. A method of selectively displaying cartographic features on a video display of a navigation system, the method comprising the steps of:
   a) determining an operational mode of the navigation system, wherein the navigation system includes first and second operational modes and a less detailed desired cartographic entity is defined by a perimeter with cross-hatching disposed within the perimeter and a more detailed desired cartographic entity is defined by a perimeter with solid shading disposed within the perimeter;
   b) selecting a desired cartographic entity for a cartographic feature based upon the operational mode including selecting a less detailed desired cartographic entity for the cartographic feature in the first operational mode and selecting a more detailed desired cartographic entity than the less detailed desired cartographic entity for the same cartographic feature in the second operational mode; and
   c) displaying the selected desired cartographic entity on the video display.

8. A method of selectively displaying cartographic features on a video display of a navigation system, the method comprising the steps of:
   a) determining an operational mode of the navigation system;
   b) selecting a first cartographic entity for a first cartographic feature based upon the operational mode, wherein the first cartographic entity is a vehicle route having a first intensity, and selecting a second intensity for a second desired cartographic entity for a second cartographic feature which is different than the first intensity; and
   c) simultaneously displaying the first and second desired cartographic entities on the video display;
   wherein the operation mode comprises on-road guidance mode in which a vehicle position is displayed relative to a road system.

9. The method of claim 8, wherein the first and second intensities are selected from a color palette having a plurality of colors.

10. The method of claim 9, wherein each of the plurality of colors are defined by blue, green, and red values with the first intensity having first blue, green, and red values and the second intensity having second blue, green, and red values that are a percentage of the first blue, green, and red values, respectively.

11. The method of claim 10, wherein the first intensity is approximately twenty-five percent less than the second intensity wherein the first blue, green, and red values are approximately twenty-five percent less than the second blue, green, and red values, respectively.

12. An apparatus for a navigation system configured to selectively display cartographic features, the apparatus comprising:
   at least one position determining device for providing a vehicle location signal;
   a database having a map with cartographic features and cartographic entities configured to represent said cartographic features;
   a processor interconnected to said at least one positioning device and said database the processor operable to determine the location of the vehicle relative to said map;
   a video display connected to said processor operable to display an area of said map;
   a plurality of operational modes each mode operable to display said map area, wherein said processor is configured to determine an operational mode from said plurality of said operational modes and to select a desired cartographic entity for a cartographic feature based upon said operational mode, said processor configured to display said selected desired cartographic entity on said video display, wherein said plurality of operational modes includes first and second operational modes, and said processor is configured to select a less detailed desired cartographic entity for said cartographic feature in said first operational mode and to select a more detailed desired cartographic entity than said less detailed desired cartographic entity for said same cartographic feature in said second operational mode, and wherein said first operational mode comprises an on-road mode in which a vehicle position is displayed relative to a road system and said second operational mode comprises an off-road mode in which said vehicle position is displayed irrelative to a road system.

13. The apparatus of claim 12, wherein said less detailed desired cartographic entity is no cartographic entity.

14. The apparatus of claim 12, wherein said first operational mode is defined by a predetermined vehicle speed.

15. The apparatus of claim 12, wherein said first operational mode comprises a panning mode.

16. The apparatus of claim 12, wherein said less detailed desired cartographic entity is defined by a perimeter with cross-hatching disposed within said perimeter and said more detailed cartographic entity is defined by said perimeter with solid shading disposed within said perimeter.

17. The apparatus of claim 12, wherein a first cartographic entity is displayed when said apparatus is in said off-road mode and said first cartographic entity is not displayed when said apparatus is in said on-road mode.

18. The apparatus of claim 12, wherein said apparatus includes a third operational mode comprising an on-road guidance mode relating to navigation guidance of the vehicle while traversing a road, and said processor is further operable to select a least detailed desired cartographic entity that is one of the same as said less detailed desired cartographic entity and a less detailed version of said less detailed desired cartographic entity.

19. A method of displaying a cartographic feature on a video display of a navigation system, the method comprising the steps of:
   a) determining an operational mode of the navigation system;
   b) selecting a first desired intensity for a first desired cartographic entity defining a first cartographic entity based upon the operational mode and selecting a second desired intensity for a second desired cartographic entity based upon the operational mode; and
   c) simultaneously displaying the first and second desired cartographic entity on the video display at the desired intensities;
   wherein the operational mode comprises on-road guidance mode in which a vehicle position is displayed relative to a road system.

20. The method of claim 19, wherein the first cartographic entity is a vehicle route having a vehicle route intensity and step b) includes selecting the desired intensity for the desired cartographic entity which is different than the vehicle route intensity.

21. The method of claim 20, wherein the vehicle route intensity and desired intensity are selected from a color palette having a plurality of colors.

22. The method of claim 21, wherein each of the plurality of colors is defined by blue, green, and red values with the vehicle route intensity having first blue, green, and red values and the second desired intensity having second blue, green, and red values that are a percentage of the first blue, green, and red values, respectively.

23. The method of claim 22, wherein the desired intensity is approximately twenty-five percent less than the vehicle route intensity wherein the first, blue, green and red values are approximately twenty-five percent less than the second blue, green, and red values, respectively.

* * * * *